United States Patent
Hu

(10) Patent No.: US 12,117,518 B2
(45) Date of Patent: Oct. 15, 2024

(54) METHOD, APPARATUS, ELECTRONIC DEVICE, AND READABLE STORAGE MEDIUM FOR DETECTION OF VEHICLE TRAVELING STATE

(71) Applicant: BEIJING QISHENG SCIENCE AND TECHNOLOGY CO., LTD., Beijing (CN)

(72) Inventor: Dalin Hu, Beijing (CN)

(73) Assignee: BEIJING QISHENG SCIENCE AND TECHNOLOGY CO., LTD., Beijing (CN)

( * ) Notice: Subject to any disclaimer, the term of this patent is extended or adjusted under 35 U.S.C. 154(b) by 353 days.

(21) Appl. No.: 17/456,569

(22) Filed: Nov. 24, 2021

(65) Prior Publication Data

US 2022/0082683 A1    Mar. 17, 2022

Related U.S. Application Data

(63) Continuation of application No. PCT/CN2020/092185, filed on May 25, 2020.

(30) Foreign Application Priority Data

May 24, 2019   (CN) .......................... 201910442231.0

(51) Int. Cl.
  *G01S 13/60*   (2006.01)
  *G01S 13/931*  (2020.01)
  (Continued)

(52) U.S. Cl.
  CPC ............ *G01S 13/60* (2013.01); *G01S 13/931* (2013.01); *G08G 1/052* (2013.01); *G08G 1/056* (2013.01); *G01S 2013/93271* (2020.01)

(58) Field of Classification Search
  CPC .................. G01S 13/60; G01S 13/931; G01S 2013/93271; G08G 1/052; G08G 1/056
  See application file for complete search history.

(56) References Cited

U.S. PATENT DOCUMENTS 4,348,675 A * 9/1982 Senzaki ................ G01S 13/931
                                                   342/128
4,876,650 A * 10/1989 Kubo ...................... B60T 8/321
                                                    701/79

(Continued)

FOREIGN PATENT DOCUMENTS

| CN | 201951453 U | 8/2011 |
| CN | 104484998 A | 4/2015 |

(Continued)

OTHER PUBLICATIONS

Konrad Reif, Automobilelektronik Eine Einführung für Ingenieure, 5th Edition, Springer Vieweg, 2014, 508 pages.

(Continued)

*Primary Examiner* — Vladimir Magloire
*Assistant Examiner* — Maxine Mckenzie Phillips
(74) *Attorney, Agent, or Firm* — METIS IP LLC

(57) ABSTRACT

The present disclosure provides a method, an apparatus, an electronic device, and a readable storage medium for detection of vehicle traveling state. The method may include obtaining a frequency of an emitted microwave from a microwave sensor and a frequency of a reflected microwave received by the microwave sensor. The microwave sensor may be located at a vehicle head of a vehicle. The method may also include obtaining a running speed of the vehicle. The method may further include determining, according to the frequency of the emitted microwave, the frequency of the reflected microwave, and the running speed, whether the vehicle is traveling in a wrong direction.

18 Claims, 7 Drawing Sheets

(51) Int. Cl.
*G08G 1/052* (2006.01)
*G08G 1/056* (2006.01)

(56) References Cited

U.S. PATENT DOCUMENTS

| | | | | |
|---|---|---|---|---|
| 5,314,037 | A * | 5/1994 | Shaw | B60K 23/08 |
| | | | | 188/DIG. 1 |
| 5,337,082 | A | 8/1994 | Fredericks | |
| 5,428,359 | A * | 6/1995 | Yoneyama | G01S 13/60 |
| | | | | 367/90 |
| 7,647,049 | B2 * | 1/2010 | Engdahl | H04B 1/7117 |
| | | | | 342/461 |
| 10,008,116 | B1 * | 6/2018 | Sandbrook | G08G 1/04 |
| 2003/0117312 | A1 | 6/2003 | Nakanishi et al. | |
| 2006/0139206 | A1 * | 6/2006 | Nagasaku | H01Q 19/062 |
| | | | | 342/115 |
| 2009/0219172 | A1 * | 9/2009 | Wilbrod | G08G 1/04 |
| | | | | 340/937 |
| 2012/0235852 | A1 | 9/2012 | Hattori et al. | |
| 2018/0251946 | A1 * | 9/2018 | Kiel | E01F 9/576 |
| 2020/0025583 | A1 * | 1/2020 | Herlocker | G08G 1/0133 |

FOREIGN PATENT DOCUMENTS

| | | | | |
|---|---|---|---|---|
| CN | 104751638 | A | | 7/2015 |
| CN | 106448189 | A | | 2/2017 |
| CN | 106855623 | A | | 6/2017 |
| CN | 107571856 | A | | 1/2018 |
| CN | 206863956 | U | * | 1/2018 |
| CN | 207165000 | U | | 3/2018 |
| DE | 102013102613 | A1 | | 9/2014 |
| EP | 1061269 | A2 * | 12/2000 | ............ B64C 13/00 |
| JP | 3102262 | B2 * | 10/2000 | |
| JP | 2004058920 | A * | 2/2004 | |
| JP | 2004138479 | A * | 5/2004 | ........... G01S 13/584 |
| JP | 3575694 | B2 * | 10/2004 | ............ G01S 13/42 |
| JP | 4461599 | B2 * | 5/2010 | |
| JP | 2010267208 | A | | 11/2010 |
| JP | 2016062443 | A * | 4/2016 | |
| JP | 6215342 | B2 * | 10/2017 | ............ G01S 19/33 |
| JP | 6924046 | B2 * | 8/2021 | ........... G01S 13/345 |

OTHER PUBLICATIONS

International Search Report in PCT/CN2020/092185 mailed on Sep. 2, 2020, 7 pages.

Written Opinion in PCT/CN2020/092185 mailed on Sep. 2, 2020, 8 pages.

First Office Action in Chinese Application No. 201910442231.0 mailed on Apr. 1, 2021, 14 pages.

The Second Office Action in Chinese Application No. 201910442231.0 mailed on Sep. 13, 2021, 15 pages.

* cited by examiner

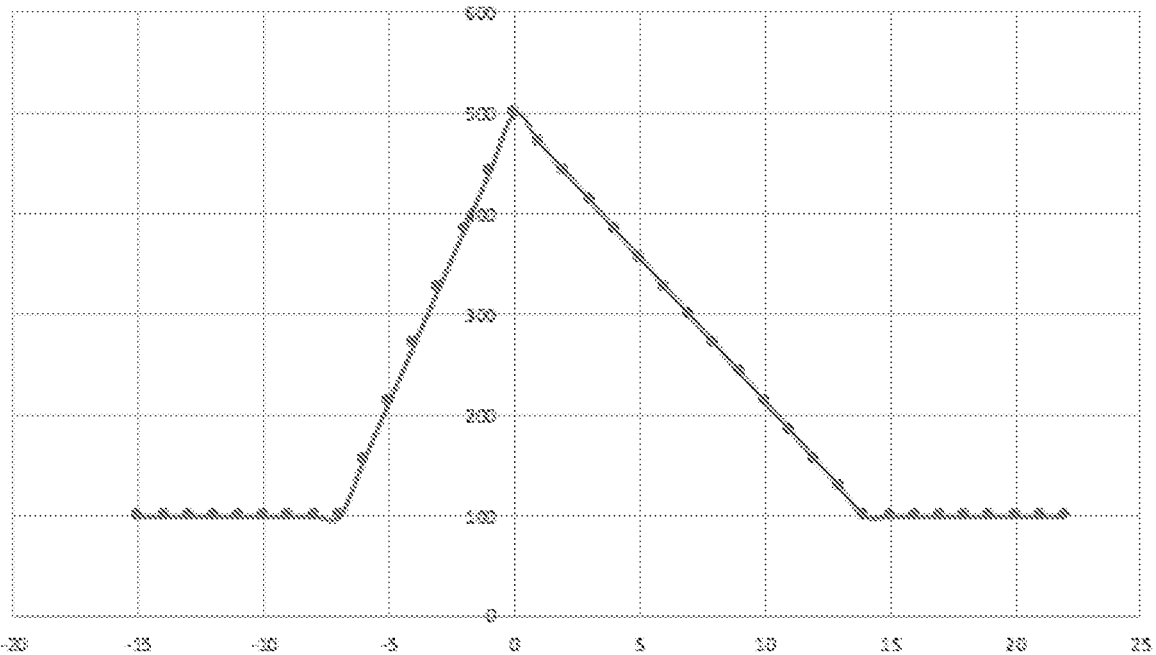

FIG. 5

```
┌─────────────────────────────────────────────────────────┐
│ Obtaining, according to a frequency of a reflected      │
│ microwave, a frequency of an emitted microwave, and a   │      S401
│ time interval between emitting the emitted microwave    │ ∽/
│ and receiving the reflected microwave, a relative speed │
│ and a distance between a vehicle and a microwave-       │
│ reflecting object                                       │
└─────────────────────────────────────────────────────────┘
                            │
                            ▼
┌─────────────────────────────────────────────────────────┐
│ Obtaining, according to the distance and the relative   │      S402
│ speed, a departure time interval                        │ ∽/
└─────────────────────────────────────────────────────────┘
                            │
                            ▼
┌─────────────────────────────────────────────────────────┐
│ Designating a minimum time interval of the departure    │
│ time interval and a time interval between two adjacent  │      S403
│ emitted microwaves from a microwave sensor as a time    │ ∽/
│ interval of a next emitted microwave from the           │
│ microwave sensor                                        │
└─────────────────────────────────────────────────────────┘
```

FIG. 6

METHOD, APPARATUS, ELECTRONIC DEVICE, AND READABLE STORAGE MEDIUM FOR DETECTION OF VEHICLE TRAVELING STATE

CROSS-REFERENCE TO RELATED APPLICATIONS

This application is a Continuation of International Application No. PCT/CN2020/092185, filed on May 25, 2020, which claims priority of Chinese Application No. 201910442231.0, filed on May 24, 2019, the contents of which are hereby incorporated by reference.

TECHNICAL FIELD

The present disclosure generally relates to the technical field of running detection, and more particularly, relates to a method, an apparatus, an electronic device, and a readable storage medium for detection of vehicle traveling state.

BACKGROUND

With the development of the sharing economy, shared vehicles have become popular. However, sometimes a user would disobey traffic rules and drive a shared vehicle in a wrong direction, resulting in danger. Thus, when the user drives in a wrong direction, it is necessary to remind the user.

In conventional technology, a global positioning system (GPS) is configured for positioning and acquiring a running trajectory of a vehicle. Further, with the assistance of a map, whether the running trajectory is at a right side of a road along a running direction can be determined, thereby detecting whether the vehicle is traveling in a wrong direction.

However, the GPS is incapable of real-time report and often suffers from time delays, resulting in delayed determination and an increase of false determination rates.

SUMMARY

In view of this, the object of the embodiments of the present disclosure is to provide a method, an apparatus, an electronic device, and a readable storage medium for detection of vehicle traveling state, which may arrange a microwave sensor on a vehicle, without relying on a global positioning system (GPS) and a map, to detect whether the vehicle is traveling in a wrong direction, so as to solve problems of delayed determination and high false determination rates in the conventional technology and achieve an effect of timely determining whether the vehicle is traveling in a wrong direction.

In a first aspect of the present disclosure, a method for detection of vehicle traveling state is provided. The method may include obtaining a frequency of an emitted microwave from a microwave sensor and a frequency of a reflected microwave received by the microwave sensor. The microwave sensor may be located at a vehicle head of a vehicle. The method may also include obtaining a running speed of the vehicle. The method may further include determining, according to the frequency of the emitted microwave, the frequency of the reflected microwave, and the running speed, whether the vehicle is traveling in a wrong direction.

In some embodiments, the determining, according to the frequency of the emitted microwave, the frequency of the reflected microwave, and the running speed, whether the vehicle is traveling in a wrong direction may include if the frequency of the reflected microwave is higher than the frequency of the emitted microwave, obtaining, according to the frequency of the emitted microwave, the frequency of the reflected microwave, a relative speed between the vehicle and a microwave-reflecting object and determining, according to the relative speed and the running speed, whether the vehicle is traveling in a wrong direction.

In some embodiments, the determining, according to the relative speed and the running speed, whether the vehicle is traveling in a wrong direction may include if the relative speed is higher than the running speed, obtaining relative speeds between the vehicle and a plurality of z in preset time; if a count of relative speed(s) higher than the running speed, among the relative speeds between the vehicle and the plurality of microwave-reflecting objects, is greater than a preset threshold value, determining that the vehicle is not traveling in a wrong direction; or if the count of the relative speed(s) higher than the running speed, among the relative speeds between the vehicle and the plurality of microwave-reflecting objects, is not greater than the preset threshold value, determining that the vehicle is traveling in a wrong direction.

In some embodiments, the method may further include determining, according to the relative speed and a preset corresponding relation between the relative speed and a microwave emitting interval, the microwave emitting interval corresponding to the relative speed; and adjusting, according to the microwave emitting interval, a time interval between two adjacent emitted microwaves from the microwave sensor.

In some embodiments, the method may further include obtaining, according to the frequency of the reflected microwave, the frequency of the emitted microwave, and a time interval between emitting the emitted microwave and receiving the reflected microwave, the relative speed and a distance between the vehicle and the microwave-reflecting object; obtaining, according to the distance and the relative speed, a departure time interval; and designating a minimum time interval of the departure time interval and a time interval between two adjacent emitted microwaves from the microwave sensor as a time interval of a next emitted microwave from the microwave sensor.

In some embodiments, the method may further include if a direction of the relative speed is opposite a running direction of the vehicle, obtaining, according to the frequency of the reflected microwave, the frequency of the emitted microwave, and a time interval between emitting the emitted microwave and receiving the reflected microwave, the relative speed and a distance between the vehicle and the microwave-reflecting object; obtaining, according to the relative speed and a difference between an effective emitting distance of the microwave sensor and the distance, a departure time interval; and designating a minimum time interval of the departure time interval and a time interval between two adjacent emitted microwaves from the microwave sensor as a time interval of a next emitted microwave from the microwave sensor.

In some embodiments, the determining, according to the frequency of the emitted microwave, the frequency of the reflected microwave, a time interval, and the running speed, whether the vehicle is traveling in a wrong direction may include if the frequency of the reflected microwave is lower than the frequency of the emitted microwave, determining that the vehicle is not traveling in a wrong direction; or if the frequency of the reflected microwave is equal to the frequency of the emitted microwave, determining that the vehicle is not traveling in a wrong direction.

In some embodiments, the determining, according to the relative speed and the running speed, whether the vehicle is traveling in a wrong direction may include if the relative speed is lower than the running speed, determining that the vehicle is not traveling in a wrong direction.

In some embodiments, the method may further include determining that if a difference between two adjacent relative speeds is higher than a preset value, objects corresponding to two adjacent relative speeds are different.

In some embodiments, the method may further include obtaining, according to the frequency of the reflected microwave, the frequency of the emitted microwave, and a time interval between emitting the emitted microwave and receiving the reflected microwave, the relative speed and a distance between the vehicle and the microwave-reflecting object; determining, according to the distance and the relative speed between the vehicle and the microwave-reflecting object, predicted collision time; and if the predicted collision time is less than or equal to preset safety time, generating an early warning for the vehicle.

In some embodiments, the method may further include if a relative speed between the vehicle and a microwave-reflecting object is higher than or equal to a preset speed, generating a prompt for the vehicle. The preset speed may be twice a maximum running speed of the vehicle.

In a second aspect of the present disclosure, an apparatus for detection of vehicle traveling state is provided. The apparatus may include an obtaining module configured to obtain a frequency of an emitted microwave from a microwave sensor and a frequency of a reflected microwave received by the microwave sensor. The microwave sensor may be located at a vehicle head of a vehicle. The obtaining module may be further configured to obtain a running speed of the vehicle. The apparatus may also include a determination module configured to determine, according to the frequency of the emitted microwave, the frequency of the reflected microwave, a time interval, and the running speed, whether the vehicle is traveling in a wrong direction.

In some embodiments, the determination module may be further configured to if the frequency of the reflected microwave is higher than the frequency of the emitted microwave, obtain, according to the frequency of the emitted microwave and the frequency of the reflected microwave, a relative speed between the vehicle and a microwave-reflecting object; and determine, according to the relative speed and the running speed, whether the vehicle is traveling in a wrong direction.

In some embodiments, the determination module may be further configured to if the relative speed is higher than the running speed, obtain relative speeds between the vehicle and a plurality of microwave-reflecting objects in preset time; if a count of relative speed(s) higher than the running speed, among the relative speeds between the vehicle and the plurality of microwave-reflecting objects, is greater than a preset threshold value, determine that the vehicle is not traveling in a wrong direction; or if the count of relative speed(s) higher than the running speed, among the relative speeds between the vehicle and the plurality of microwave-reflecting objects, is not greater than the preset threshold value, determine that the vehicle is traveling in a wrong direction.

In some embodiments, the apparatus may further include an adjustment module configured to determine, according to the relative speed and a preset corresponding relation between the relative speed and a microwave emitting interval, the microwave emitting interval corresponding to the relative speed; and adjusting, according to the microwave emitting interval, a time interval between two adjacent emitted microwaves from the microwave sensor.

In some embodiments, the obtaining module may be further configured to obtain, according to the frequency of the reflected microwave, the frequency of the emitted microwave, and a time interval between emitting the emitted microwave and receiving the reflected microwave, the relative speed and a distance between the vehicle and the microwave-reflecting object; obtaining, according to the distance and the relative speed, a departure time interval; and designating a minimum time interval of the departure time interval and a time interval between two adjacent emitted microwaves from the microwave sensor as a time interval of a next emitted microwave from the microwave sensor.

In some embodiments, the obtaining module may be further configured to if a direction of the relative speed is opposite a running direction of the vehicle, obtain, according to the frequency of the reflected microwave, the frequency of the emitted microwave, and a time interval between emitting the emitted microwave and receiving the reflected microwave, the relative speed and a distance between the vehicle and the microwave-reflecting object; obtain, according to the relative speed and a difference between an effective emitting distance of the microwave sensor and the distance, a departure time interval; and designate a minimum time interval of the departure time interval and a time interval between two adjacent emitted microwaves from the microwave sensor as a time interval of a next emitted microwave from the microwave sensor.

In some embodiments, the determination module may be further configured to if the frequency of the reflected microwave is lower than the frequency of the emitted microwave, determine that the vehicle is not traveling in a wrong direction; or if the frequency of the reflected microwave is equal to the frequency of the emitted microwave, determine that the vehicle is not traveling in a wrong direction.

In some embodiments, the determination module may be further configured to if the relative speed is lower than the running speed, determine that the vehicle is not traveling in a wrong direction.

In some embodiments, the determination module may be further configured if a difference between two adjacent relative speeds is higher than a preset value, determine that objects corresponding to the two adjacent relative speeds are different.

In some embodiments, the apparatus may further include an early warning module configured to obtain, according to the frequency of the reflected microwave, the frequency of the emitted microwave, and a time interval between emitting the emitted microwave and receiving the reflected microwave, the relative speed and a distance between the vehicle and the microwave-reflecting object; determining, according to the distance and the relative speed between the vehicle and the microwave-reflecting object, predicted collision time; and if the predicted collision time is less than or equal to preset safety time, generating an early warning for the vehicle.

In some embodiments, the apparatus may further include a prompt module configured to if a relative speed between the vehicle and a microwave-reflecting object is higher than or equal to a preset speed, generating a prompt for the vehicle. The preset speed may be twice a maximum running speed of the vehicle.

In a third aspect of the present disclosure, an electronic device is provided. The electronic may include a processor, a computer readable storage medium and a bus. The computer readable storage medium may store machine readable instructions executable by the processor. When the electronic device operates, the processor may be in communication with the computer readable storage medium by means of the bus, and the processor executes the machine readable instructions to perform operations of the method for detection of vehicle traveling state provided in the first aspect.

A fourth aspect of the present disclosure provides a computer readable storage medium. The computer readable storage medium may store computer programs, when executed by a processor, direct the processor to perform operations of the method for detection of vehicle traveling state provided in the first aspect.

According to any one of the above aspects, by a microwave sensor emitting a microwave and receiving a reflected microwave, whether a vehicle is traveling in a wrong direction may be determined according to a frequency of the emitted microwave, a frequency of the reflected microwave, and a running speed of the vehicle. Without relying on the GPS and the map, whether the vehicle is traveling in a wrong direction may be determined according to the frequency of the emitted microwave from the microwave sensor, the frequency of the reflected microwave of the microwave sensor, and the running speed of the vehicle, which effectively avoids delayed determination caused by reporting delay, thereby achieving timely and accurate determination, and improving accuracy and stability of determining whether the vehicle is traveling in a wrong direction.

BRIEF DESCRIPTION OF THE DRAWINGS

To describe the technical solutions of the embodiments of the present disclosure more clearly, the following briefly describes the accompanying drawings needed in the embodiments. It may be understood that the following accompanying drawings show merely some embodiments of the present disclosure, which are not intended to limit the scope of the present disclosure, and those of ordinary skill in the art can still derive other related accompanying drawings from the accompanying drawings without creative efforts.

FIG. 5 is a schematic diagram illustrating a preset corresponding relation between a relative speed and a microwave emitting interval in a method for detection of vehicle traveling state according to some embodiments of the present disclosure;

FIG. 6 is a flowchart illustrating an exemplary method for detection of vehicle traveling state according to some embodiments of the present disclosure;

DETAILED DESCRIPTION

Figure 1:
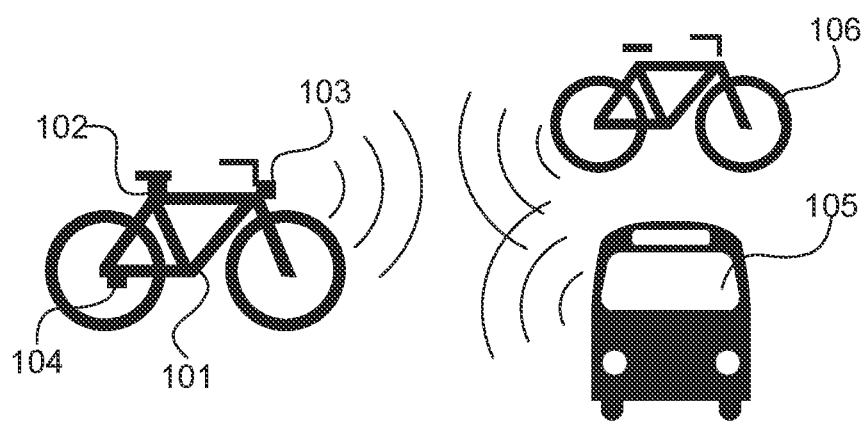
FIG. 1 is a schematic diagram illustrating an exemplary application scenario of a method for detection of vehicle traveling state according to some embodiments of the present disclosure.

For clearer descriptions of the objects, technical solutions, and advantages of the embodiments of the present disclosure, the following clearly and completely describes the technical solutions in the embodiments of the present disclosure with reference to the accompanying drawings of the embodiments of the present disclosure. It may be understood that the accompanying drawings attached to the present disclosure are merely intended to illustrate and describe the present disclosure, instead of limiting the scope of the present disclosure. It may be additionally understood that these drawings may not be necessarily drawn to the actual scale. The flowcharts used in the present disclosure illustrate operations performed in some embodiments of the present disclosure. It may be understood that the operations may not be performed in order. Conversely, without logic relationships and contexts, the operations may be performed in inverted order, or simultaneously. Besides, under the teaching of the present disclosure, a person skilled in the art may add one or more other operations to a flowchart, or may remove one or more operations from the flowchart.

In addition, the embodiments described herein are merely exemplary embodiments, but are not all embodiments of the present disclosure. Generally, components of the embodiments of the present disclosure described or illustrated in the drawings herein may be arranged and designed in different configurations. Therefore, the detailed descriptions of the embodiments of the present disclosure illustrated with reference to the accompanying drawings are not intended to limit the scope of the present disclosure, but are intended to merely illustrate some optional and exemplary embodiments of the present disclosure. Based on the embodiments of the present disclosure, all other embodiments derived by a person skilled in the art without any creative efforts shall fall within the scope of the present disclosure.

In order to enable those skilled in the art to use the content of the present disclosure, the following embodiments are described in combination with a specific application scenario of "two-wheeled vehicle wrong-direction running detection." For those skilled in the art, the general principles defined herein may be applied to other embodiments and application scenarios without departing from the spirit and scope of the present disclosure. Although the present disclosure mainly focuses on the two-wheeled vehicle wrong-direction running detection, it may be understood that this is only an exemplary embodiment. The present disclosure may be applied to any other transportation types. For example, the present disclosure may further be applied to vehicles such as automobiles, tricycles, unicycles, electronic bicycles and balance vehicles, which is not limited herein.

It should be noted that in the embodiments of the present disclosure, the terms "comprise," "comprises," and/or "comprising," "include," "includes," and/or "including," are configured to specify the presence of stated features, but do not preclude the presence or addition of one or more other features.

FIG. 1 is a schematic diagram illustrating an exemplary application scenario of a method for detection of vehicle traveling state according to some embodiments of the present disclosure.

As shown in FIG. 1, a vehicle 101 may be included. In some embodiments, a two-wheeled vehicle is taken as an example for description. Certainly, the vehicle 101 may further include a vehicle in another form, which is described in detail herein. The two-wheeled vehicle may include a bicycle, an electric bicycle, a motorcycle, an electric motorcycle, or the like, or any combination thereof. The vehicle 101 may be provided with a controller 102. The controller 102 may be communicatively connected with a wheel speed sensor 104 arranged on a wheel of the vehicle 101 and a microwave sensor 103 arranged on a vehicle head of the vehicle 101. The controller 102 may be a center control equipment of the vehicle 101. The microwave sensor 103 may also include a Doppler sensor or a Doppler microwave sensor.

In some embodiments, the controller 102 may include one or more processor cores (e.g., a single-core processor or a multi-core processor). Merely by way of example, the controller 102 may include a central processing unit (CPU), an application specific integrated circuit (ASIC), an application specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit (MCU), a reduced instruction set computing (RISC), a microprocessor, or the like, or any combination thereof.

In some embodiments, the controller 102 may be connected with the wheel speed sensor 104 and the microwave sensor 103 in a wired connection or a wireless connection. For example, the wired connection may include a network cable, a communication cable, an optical fiber, or the like, or any combination thereof. The wireless connection may include a cellular mobile network connection, by means of, for example, Second Generation (2G), Third Generation (3G), Fourth Generation (4G), 4G+, Fifth Generation (5G), or the like, or any combination thereof. A typical 4G network may include a Long Term Evolution (LET) network. Alternatively, the wireless connection may further include a connection of Internet of Things, by means of, for example, ZigBee, Wireless-Fidelity (Wi-fi), Narrow Band Internet of Things (NB-IoT), Long Range (LoRa), enhanced Machine-Type Communication (eMTC), Near Field Communication (NFC), or the like, or any combination thereof.

In some embodiments, the vehicle 101 may control, via the controller 102, the microwave sensor 103 to emit a microwave and receive a microwave reflected by an object in a running direction of the vehicle 101. The object may include a two-wheeled vehicle 106, an automobile 105, a pedestrian, a tree, or the like, or any combination thereof.

Figure 2:
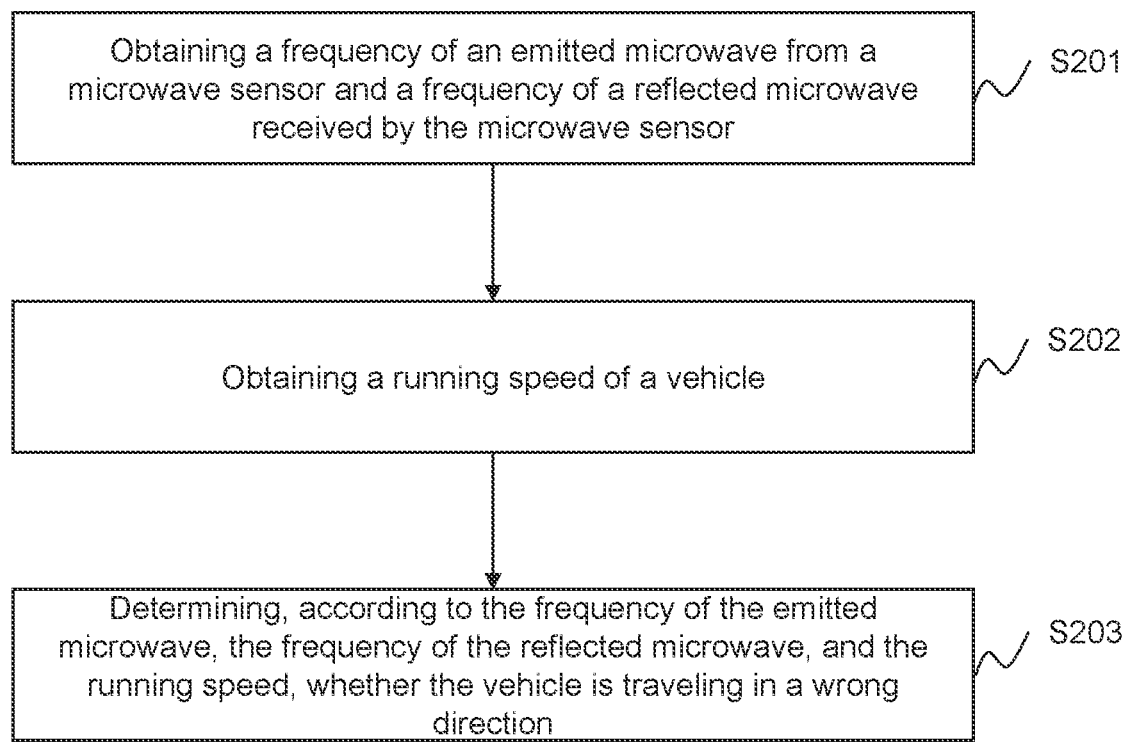
FIG. 2 is a flowchart illustrating an exemplary method for detection of vehicle traveling state according to some embodiments of the present disclosure.

FIG. 2 is a flowchart illustrating an exemplary method for detection of vehicle traveling state according to some embodiments of the present disclosure. The method for detection of vehicle traveling state may be achieved by the controller 102 of the vehicle 101 in FIG. 1. As shown in FIG. 2, the method may include following operations.

In S201, a frequency of an emitted microwave from a microwave sensor and a frequency of a reflected microwave received by the microwave sensor may be obtained.

The microwave sensor may be located at a vehicle head of a vehicle.

In some embodiments, a microwave emitting port and a microwave receiving port of the microwave sensor at the vehicle head may face a running direction of the vehicle, i.e., be consistent with an orientation of the vehicle head of the vehicle. In such cases, the microwave sensor may be capable of conveniently emitting a microwave in the running direction and receiving a microwave reflected by other object in the running direction.

In some embodiments, the microwave sensor may emit and receive a microwave. The microwave emitted by the microwave sensor may occur reflection and be reflected to the microwave sensor when the microwave contacts with an object. Then the microwave sensor may capture the reflected microwave. The emitted microwave may have a fixed frequency. The frequency of the received reflected microwave may vary along with variation of a distance between the vehicle and the object. For example, when the vehicle and the object are relatively close to each other, i.e., the distance between the vehicle and the object decreases, the frequency of the received reflected microwave may increase; when the vehicle and the object are relatively away from each other, i.e., the distance between the vehicle and the object increases, the frequency of the received reflected microwave may decrease; and when the vehicle and the object are relatively stationary, that is, the distance between the vehicle and the object does not change, the frequency of the received reflected microwave may decrease.

The controller executing the method for detection of vehicle traveling state may obtain the frequency of the emitted microwave and the frequency of the reflected microwave from the microwave sensor.

In S202, a running speed of the vehicle may be obtained.

In some embodiments, a wheel speed of the vehicle may be acquired via the wheel speed sensor of the vehicle. Since a circumference of the wheel of the same vehicle is fixed, the running speed of the vehicle may be determined according to the circumference of the wheel and the wheel speed. The above embodiment is only an exemplary way to obtain the running speed, which is not intended to limit the present disclosure.

In S203, whether the vehicle is traveling in a wrong direction may be determined according to the frequency of the emitted microwave, the frequency of the reflected microwave, and the running speed.

A motion relation (e.g., approaching, moving away and standing still, etc.) between the vehicle and the object may be obtained according to the frequency of the emitted microwave and the frequency of the reflected microwave. Whether the vehicle is traveling in a wrong direction may be determined according to the motion relation and the running speed, In some embodiments, by a microwave sensor emitting a microwave and receiving a reflected microwave, whether a vehicle is traveling in a wrong direction may be determined according to a frequency of the emitted microwave, a frequency of the reflected microwave, and a running speed of the vehicle. Without relying on the GPS and the map, whether the vehicle is traveling in a wrong direction may be determined according to the frequency of the emitted microwave from the microwave sensor, the frequency of the reflected microwave of the microwave sensor, and the running speed of the vehicle, which effectively avoids delayed determination caused by reporting delay, thereby achieving timely and accurate determination, and improving accuracy and stability of determining whether the vehicle is traveling in a wrong direction.

In some embodiments, the determining, according to the frequency of the emitted microwave, the frequency of the reflected microwave, a time interval, and the running speed, whether the vehicle is traveling in a wrong direction may include following operations.

In some embodiments, if the frequency of the reflected microwave is lower than the frequency of the emitted microwave, it may be determined that the vehicle is not traveling in a wrong direction.

If the frequency of the reflected microwave is lower than the frequency of the emitted microwave, it may indicate that a moving direction of a microwave-reflecting object (also referred to as an object for brevity) is the same as a direction of the vehicle and the running speed of the vehicle is lower than a moving speed of the microwave-reflecting object (i.e., a direction of a relative speed is opposite the running direction of the vehicle). In such cases, since the moving direction of the microwave-reflecting object is the same as the direction of the vehicle, it may be determined that the vehicle is not traveling in a wrong direction.

Alternatively, in some embodiments, if the frequency of the reflected microwave is equal to the frequency of the emitted microwave, it may be determined that the vehicle is not traveling in a wrong direction.

If the frequency of the reflected microwave is equal to the frequency of the emitted microwave, there may be no moving object around the vehicle or the moving object may be at the same speed as the vehicle. In such cases, there may be multiple possibilities. If the speed of the moving object is the same as that of the vehicle, the moving speed and the direction of the object may be the same as that of the vehicle, which indicates that the vehicle is not traveling in a wrong direction. If there is no moving object around the vehicle, it may be impossible to accurately determine whether the vehicle is traveling in a wrong direction. But only for safety reasons, when there is no moving object around the vehicle, the vehicle may be safe regardless of whether the vehicle is traveling in a wrong direction or not, so it may be determined that the vehicle is not traveling in a wrong direction.

Alternatively, in some embodiments, if the frequency of the reflected microwave is higher than the frequency of the emitted microwave, a relative speed between the vehicle and a microwave-reflecting object may be obtained according to the frequency of the emitted microwave and the frequency of the reflected microwave. Whether the vehicle is traveling in a wrong direction may be determined according to the relative speed and the running speed.

In some embodiments, the relative speed may be determined according to a formula of Doppler effect:

$$f' = \left(\frac{v \pm v_0}{v \mp v_s}\right)f,$$

where f is the frequency of the emitted microwave, f' is the frequency of the received reflected microwave, v is a propagation speed of a microwave in air, $v_0$ is the moving speed of the microwave-reflecting object, and $v_s$ is the running speed of the vehicle. When f'>f, + is used before $v_0$ and − is used before $v_s$; and when f'<f, − is used before $v_0$ and + is used before $v_s$. If f, f', v and $v_s$ are known, $v_0$ may be determined.

It should be noted that the relative speed v is a speed difference between $v_s$ and $v_0$. For example, if the running speed $v_s$ of the vehicle is 2 m/s (i.e., $v_s$=2 m/s), the moving direction of the microwave-reflecting object is the same as that of the vehicle, and the moving speed $v_0$ of the object is 1.5 m/s (i.e., $v_0$=1.5 m/s), the relative speed $v_x$ may be 0.5 m/s (i.e., $v_x$=2 m/s−1.5 m/s=0.5 m/s). Alternatively, if the running speed $v_s$ of the vehicle is 2 m/s (i.e., $v_s$=2 m/s), the moving direction of the microwave-reflecting object is opposite that of the vehicle, and the moving speed $v_0$ is −1.5 m/s (i.e., $v_0$=−1.5 m/s), the relative speed $v_x$ is 2.5 m/s (i.e., $v_x$=2 m/s−(−1.5 m/s)=2.5 m/s).

When the frequency of the reflected microwave is higher than the frequency of the emitted microwave, there may be two possibilities one of which is the moving direction of the vehicle is the same as that of the microwave-reflecting object and the running speed of the vehicle is higher than the moving speed of the microwave-reflecting object, or another of which is the moving direction of the vehicle is opposite that of the microwave-reflecting object, so it is impossible to directly determine whether the vehicle is traveling in a wrong direction. Thus, in the above embodiments, according to a relation between the relative speed and the running speed, it may be further determined when the frequency of the reflected microwave is higher than the frequency of the emitted microwave, whether the vehicle is traveling in a wrong direction, thereby improving the accuracy of detecting whether the vehicle is traveling in a wrong direction is improved, and achieving more accurate detection.

Figure 3:
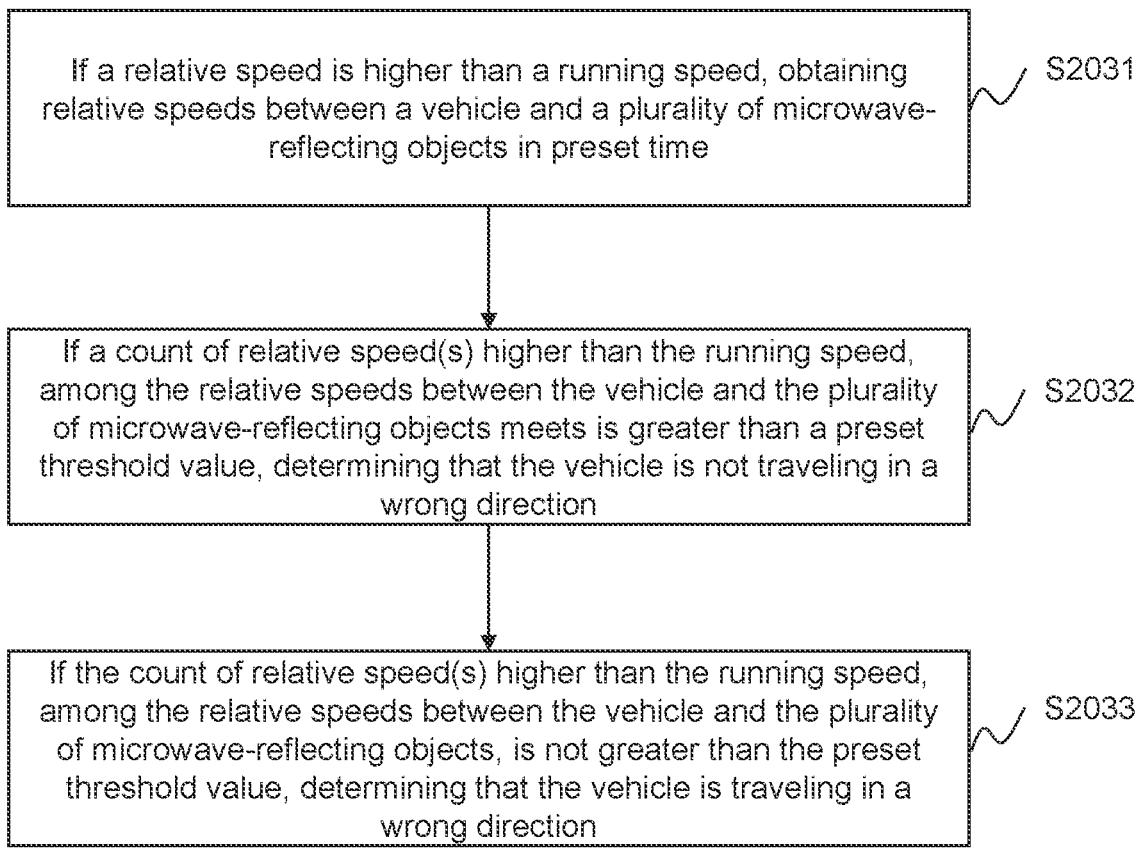
FIG. 3 is a flowchart illustrating an exemplary method for detection of vehicle traveling state according to some embodiment of the present disclosure.

FIG. 3 is a flowchart illustrating an exemplary method for detection of vehicle traveling state according to some embodiments of the present disclosure.

In some embodiments, the determining, according to the relative speed and the running speed, whether the vehicle is traveling in a wrong direction may include following operations.

If the relative speed is lower than the running speed, it may be determined that the vehicle is not traveling in a wrong direction.

If the relative speed is lower than the running speed, according to the determination of the relative speed, it may be determined that if the direction of the vehicle is the same as that of a moving object, the vehicle may do not run in a wrong direction.

In some embodiments, as shown in FIG. 3, the determining, according to the relative speed and the running speed, whether the vehicle is traveling in a wrong direction may include following operations.

In S2031, if the relative speed is higher than the running speed, relative speeds between the vehicle and a plurality of microwave-reflecting objects may be obtained in preset time.

According to the above example of determination of the relative speed, it may be known that when the moving direction of the microwave-reflecting object is opposite that of the vehicle, the relative speed may be higher than the running speed. Thus, when the relative speed is higher than the running speed, there may be a moving object with a direction opposite the running direction of the vehicle. The moving object may include a two-wheeled vehicle, an automobile, etc., which is not limited herein.

In S2032, if a count of relative speed(s) higher than the running speed, among the relative speeds between the vehicle and the plurality of microwave-reflecting objects, is greater than a preset threshold value, it may be determined that the vehicle is not traveling in a wrong direction.

In some embodiments, the vehicle may obtain the relative speeds between the vehicle and the plurality of microwave-reflecting objects. The plurality of object may include an object with a same running direction as the vehicle (i.e., the relative speed is lower than the running speed) and an object with the running direction different from the vehicle (i.e., the relative speed is higher than the running speed). In preset time after the relative speed is detected to be higher than the running speed, a count of moving objects continuously detected to have directions the same as the running direction of the vehicle is denoted by a, a count of moving objects continuously detected to have directions different from the running direction of the vehicle is denoted by b, and a proportion $$\frac{a}{a+b}$$

of the moving objects with running directions the same as that of the vehicle is greater than the preset threshold value. Accordingly, it may be determined that the vehicle is not traveling in a wrong direction. For example, in 30 s after the relative speed is detected to be higher than the running speed, it may be continuously detected that a=3 and b=1. The preset threshold value may be $$0.7 \cdot \frac{a}{a+b}$$

may be 0.75 that is greater than 0.7. Accordingly, it may be determined that the vehicle is not traveling in a wrong direction.

In S2033, if the count of relative speed(s) higher than the running speed, among the relative speeds between the vehicle and the plurality of microwave-reflecting objects, is not greater than the preset threshold value, it may be determined that the vehicle is traveling in a wrong direction.

It should be noted that the determination of S2033 is the same as that of S2032, that is, if $$\frac{a}{a+b}$$

is lower than the preset threshold value, it may be determined that the vehicle is not traveling in a wrong direction. For example, in 30 s after the relative speed is detected to be higher than the running speed, it may be continuously detected that a=1 and b=3. The preset threshold value may be $$0.7 \cdot \frac{a}{a+b}$$

may be 0.25 that is lower than 0.7. Accordingly, it may be determined that the vehicle is traveling in a wrong direction.

In some embodiments, if the relative speed is higher than the running speed, by a determination of a proportion of object(s) with a same running direction as the vehicle, whether the vehicle is traveling in a wrong direction may be determined. When the proportion of moving object(s) with the same running direction as the vehicle is greater than a preset threshold value, the direction of the vehicle may be the same as those of most of the moving objects, and it may be determined that the vehicle is not traveling in a wrong direction; otherwise, it may be determined that the vehicle is traveling in a wrong direction, thereby achieving determining whether the vehicle is traveling in a wrong direction more accurately.

Figure 4:
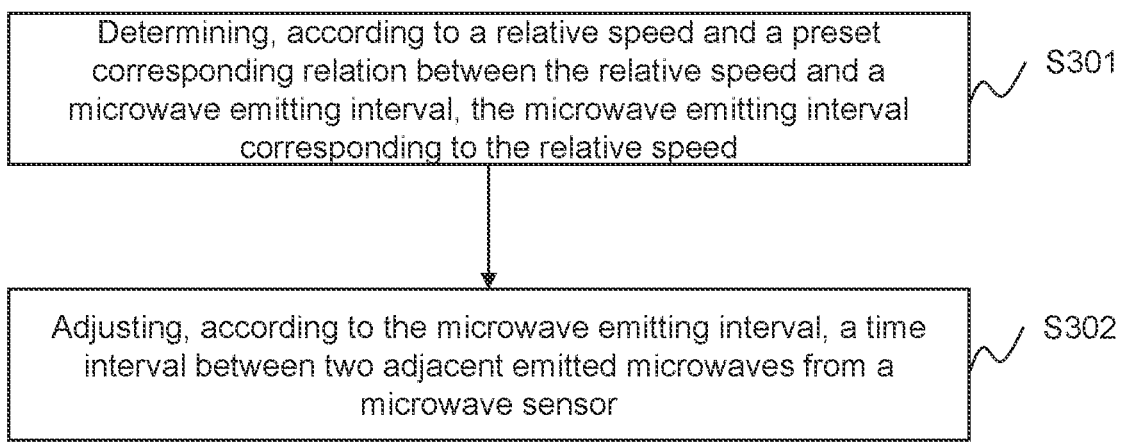
FIG. 4 is a flowchart illustrating an exemplary method for detection of vehicle traveling state according to some embodiments of the present disclosure.

FIG. 4 is a flowchart illustrating an exemplary method for detection of vehicle traveling state according to some embodiments of the present disclosure.

In some embodiments, as shown in FIG. 4, the method for detection of vehicle traveling state may further include following operations.

In S301, according to a relative speed and a preset corresponding relation between the relative speed and a microwave emitting interval, the microwave emitting interval corresponding to the relative speed may be determined.

It should be noted that the vehicle may continuously emit microwaves at same microwave emitting intervals. There may be a same object being measured repeatedly, resulting the same object being determined repeatedly. Accordingly, the number of counts of objects with the same running direction as the vehicle may be lower than that of objects with different running directions from the vehicle, resulting in inaccurate determination of a proportion of the objects with the same running direction as the vehicle.

Regarding this, according to the preset corresponding relation between the relative speed and the microwave emitting interval, the microwave emitting interval corresponding to the relative speed may be determined. For example, a minimum microwave emitting interval may be set to be 100 ms, and a maximum microwave emitting interval may be set to be 500 ms.

Then, according to a magnitude and a direction of the relative speed, the corresponding microwave emitting interval may be determined. When absolute values of relative speeds are the same (i.e., magnitudes of the relative speeds are the same) but the directions thereof are different, it may be necessary to adjust, according to the directions of the relative speeds, the determined microwave emitting interval.

FIG. 5 is a schematic diagram illustrating a preset corresponding relation between a relative speed and a microwave emitting interval in a method for detection of vehicle traveling state according to some embodiments of the present disclosure.

Taking an electric bicycle as an example, as shown in FIG. 5, when the relative speed is 5 m/s, a distance between a vehicle and a moving object is decreased, and then a microwave emitting interval may be increased; and when the relative speed is −5 m/s, the distance between the vehicle and the moving object is increased, and then the microwave emitting interval may be decreased, which is not intended to limit the present disclosure. In FIG. 5, a unit of ordinate is ms, and a unit of abscissa is m/s.

When the relative speed is lower than −7 m/s (about 25 km/h) or higher than 14 m/s (about 50 km/h), a speed of the electric bicycle reaches a maximum speed, and the microwave emitting interval is set as a minimum microwave emitting interval 100 ms.

When it is measured at a certain microwave emitting interval, the same object may be recorded N times. For example, the higher the relative speed, the faster the vehicle gets away from the moving object, and the faster the moving object may get out of a detection range of the microwave sensor. In such cases, the microwave emitting interval may be decreased, ensuring that the moving object is recorded N times. Correspondingly, the lower the relative speed, the slower the vehicle gets away from the moving object, and the slower the moving object may get out of the detection range of the microwave sensor. In such cases, the microwave emitting interval may be increased, ensuring that the moving object is recorded N times.

According to the above solution, the number of the objects with the same running direction as the vehicle may be recorded as aN, the number of the objects with different running directions from the vehicle may be recorded as bN, and a formula of the proportion of the objects with the same running directions as the vehicle may be $$\frac{aN}{aN+bN} = \frac{a}{a+b},$$

which avoids the inaccurate determination of the proportion of the objects with the same running direction as the vehicle.

In S302, a time interval between two adjacent emitted microwaves from the microwave sensor may be adjusted according to the microwave emitting interval.

In some embodiments, the time interval between two adjacent emitted microwaves from the microwave sensor may be adjusted according to the microwave emitting interval, which may achieve a solution in S301.

FIG. 6 is a flowchart illustrating an exemplary method for detection of vehicle traveling state according to some embodiments of the present disclosure.

In some embodiments, as shown in FIG. 6, the method for detection of vehicle traveling state may further include following operations.

In S401, the relative speed and a distance between the vehicle and the microwave-reflecting object may be obtained according to the frequency of the reflected microwave, the frequency of the emitted microwave, and a time interval between emitting the emitted microwave and receiving the reflected microwave.

According to the above described determination of the relative speed, the relative speed $v_x$ between the vehicle and the microwave-reflecting object may be obtained according to the frequency of the reflected microwave and the frequency of the emitted microwave. The time interval between emitting the emitted microwave and receiving the reflected microwave may be denoted by $t_1$, the distance may be denoted by S, and a propagation speed of a microwave in the air may be denoted by v. Then, $$S = \frac{1}{2} v \cdot t_1.$$

In S402, a departure time interval may be obtained according to the distance and the relative speed.

The departure time interval refers to time of the vehicle missing the microwave-reflecting object. The departure time interval may be denoted by $t_2$. Then, $$t_2 = \frac{S}{v_x}.$$

In S403, a minimum time interval of the departure time interval and a time interval between two adjacent emitted microwaves from the microwave sensor may be designated as a time interval of a next emitted microwave from the microwave sensor.

In some embodiments, if $t_2$ is longer than the microwave emitting interval corresponding to the relative speed which is determined according to the preset corresponding relation between the relative speed and the microwave emitting interval in S301, the time interval of the next emitted microwave from the microwave sensor may be the microwave emitting interval corresponding to the relative speed. Alternatively, if $t_2$ is less than the microwave emitting interval corresponding to the relative speed, the time interval of the next emitted microwave from the microwave sensor may be $t_2$. By comparing $t_2$ and the microwave emitting interval corresponding to the relative speed and designating the less one of $t_2$ and the microwave emitting interval corresponding to the relative speed as the time interval of the next emitted microwave from the microwave sensor, it may be further ensured that when the running direction of the vehicle is opposite the moving direction of the object, the same object may be recorded N times, thus ensuring that the determined proportion of the objects with the same running direction as the vehicle is accurate.

Figure 7:
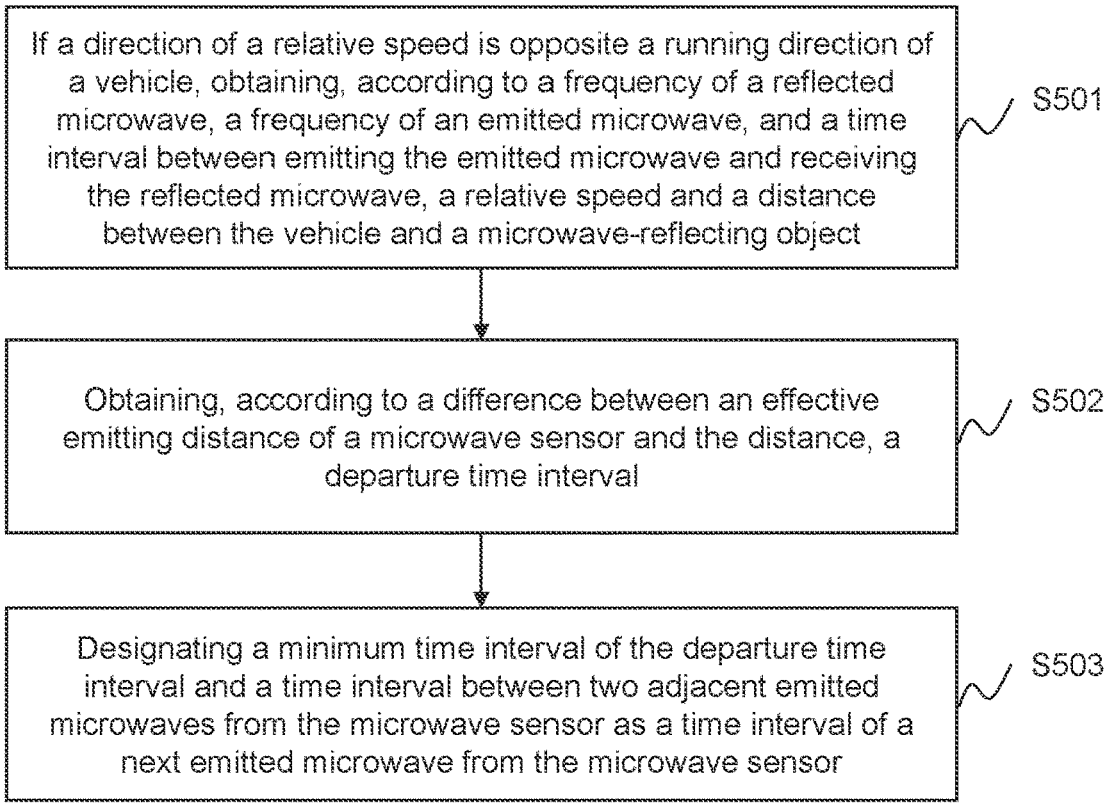
FIG. 7 is a flowchart illustrating an exemplary method for detection of vehicle traveling state according to some embodiments of the present disclosure.

FIG. 7 is a flowchart illustrating an exemplary method for detection of vehicle traveling state according to some embodiments of the present disclosure.

In some embodiments, as shown in FIG. 7, the method for detection of vehicle traveling state may further include following operations.

In S501, if a direction of the relative speed is opposite a running direction of the vehicle, the relative speed and a distance between the vehicle and the microwave-reflecting object may be obtained according to the frequency of the reflected microwave, the frequency of the emitted microwave, and a time interval between emitting the emitted microwave and receiving the reflected microwave.

The determination of the relative speed and the distance in S501 may be the same as that in S401, which is not repeated herein.

In S502, a departure time interval may be obtained according to the relative speed and a difference between an effective emitting distance of the microwave sensor and the distance.

In some embodiments, the effective emitting distance of the microwave sensor may be denoted by s. For example, s may be 15 m, which is not limited to this.

According to the determination in S402, when s>S, then, $$t_2 = \frac{s-S}{v_x}.$$

In S503, a minimum time interval of the departure time interval and the time interval between two adjacent emitted microwaves from the microwave sensor may be designated as a time interval of a next emitted microwave from the microwave sensor.

In some embodiments, if $t_2$ is longer than the microwave emitting interval corresponding to the relative speed, which is determined according to the preset corresponding relation between the relative speed and the microwave emitting interval in S301, the time interval of the next emitted microwave from the microwave sensor may be the microwave emitting interval corresponding to the relative speed. Alternatively, if $t_2$ is less than the microwave emitting interval corresponding to the relative speed, the time interval of the next emitted microwave from the microwave sensor may be $t_2$. By comparing $t_2$ and the microwave emitting interval corresponding to the relative speed and designating the less one of $t_2$ and the microwave emitting interval corresponding to the relative speed as the time interval of the next emitted microwave from the microwave sensor, it may be further ensured that when the direction of the relative speed is opposite the running direction of the vehicle, the same object may be recorded N times, thus ensuring that the determined proportion of the objects with the running directions the same as the vehicle is accurate.

In some embodiments, the method for detection of vehicle traveling state may further include following operations.

If a difference between two adjacent relative speeds is higher than a preset value, it may be determined that objects corresponding to the two adjacent relative speeds are different.

In some embodiments, the preset value may be determined by considering an application scenario of the vehicle and a current acceleration performance of the vehicle. For example, the preset value may be set to be 0.5 m/s, that is, an acceleration of the same moving object does not exceed 0.5 m/s within a time interval of the two adjacent relative speeds. For example, if the two adjacent relative speeds are 1 m/s and 2 m/s, respectively, and the difference between the relative speeds is 1 m/s that is higher than 0.5 m/s, the two relative speeds may correspond to different moving objects.

In some embodiments, the method for detection of vehicle traveling state may further include following operations.

If it is determined that the vehicle is traveling in a wrong direction, an early warning may be generated for the vehicle. A mode of the early warning may include a sound warning, a light warning, a braking deceleration warning, or the like, or any combination thereof, which is not limited herein.

For example, an early warning voice may be broadcast via a loudspeaker, the early warning may be generated by a flashing mode of a light arranged on the vehicle, or an automatic braking may be conducted after it is determined that the vehicle is traveling in a wrong direction. The above operations may be conducted independently or in combination, which is not limited herein.

If the vehicle is traveling in a wrong direction, there may be a potential safety hazard, which may cause danger to a user of the vehicle. By the early warning, the user may be reminded that there is a potential safety hazard in a current environment, such that the user may adjust the running direction or a running position, ensuring safety of the user.

Figure 8:
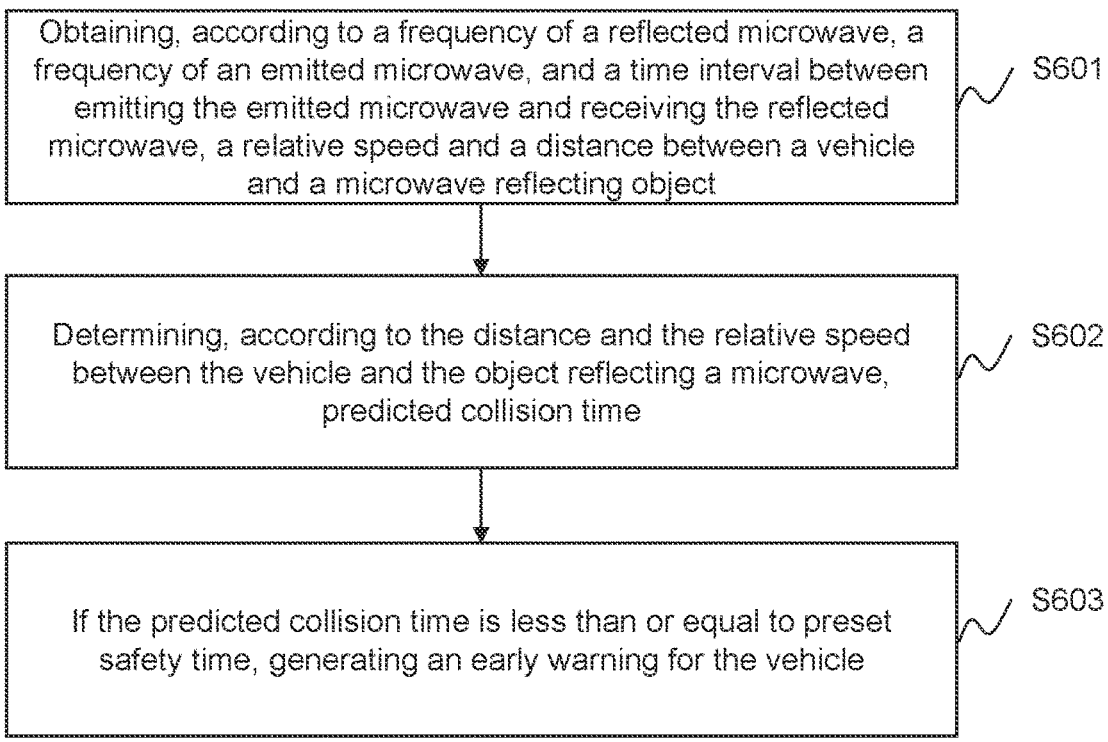
FIG. 8 is a flowchart illustrating an exemplary method for detection of vehicle traveling state according to some embodiments of the present disclosure.

FIG. 8 is a flowchart illustrating an exemplary method for detection of vehicle traveling state according to some embodiments of the present disclosure.

In some embodiments, as shown in FIG. 8, the method for detection of vehicle traveling state may further include following operations.

In S601, the relative speed and a distance between the vehicle and the microwave-reflecting object may be obtained according to the frequency of the reflected microwave, the frequency of the emitted microwave, and a time interval between emitting the emitted microwave and receiving the reflected microwave.

The obtaining of the relative speed and the distance between the vehicle and the microwave-reflecting object in S601 may be the same as that in S401, which is not repeated herein.

In S602, predicted collision time may be determined according to the distance and the relative speed between the vehicle and the microwave-reflecting object.

In some embodiments, the predicted collision time refers to a ratio of the distance to the relative speed. For example, if the distance is 5 m and the relative speed is 2.5 m/s, the predicted collision time may be 2 s.

In S603, if the predicted collision time is less than or equal to preset safety time, an early warning may be generated for the vehicle.

It should be noted that if the predicted collision time is less than or equal to the preset safety time, there may be a large collision probability, which may cause an unsafe situation. Accordingly, the early warning may be generated for the vehicle, such that the user can know that there is a potential safety hazard in the current environment, and be reminded to adjust the running direction, the running speed, or the running position of the vehicle, ensuring the safety of the user. A mode of the early warning herein may be the same as that described elsewhere in the present disclosure, which is not repeated herein.

In some embodiments, the method for detection of vehicle traveling state may further include following operations.

If the relative speed between the vehicle and the microwave-reflecting object is higher than or equal to a preset speed, a prompt may be generated for the vehicle. The preset speed may be twice a maximum running speed of the vehicle.

For the vehicle of a two-wheeled vehicle, especially an electronic bicycle, since there is a designed upper speed limit (25 km/h), when two electronic bicycles move towards each other in opposite directions and run at a full speed, a maximum relative speed between the two electronic bicycles may be 50 km/h, which is twice a maximum running speed.

If the relative speed is detected to be higher than twice the maximum running speed, the electronic bicycle may be determined to occupy a motorway and there may be a potential safety hazard, thereby a prompt may be generated for the vehicle to enable the user to know that there is the potential safety hazard in the current environment and remind the user to adjust the running position of the vehicle, ensuring the safety of the user. A mode of the prompt may be the same as that of the early warning as described elsewhere in the present disclosure, which is not repeated herein.

Figure 9:
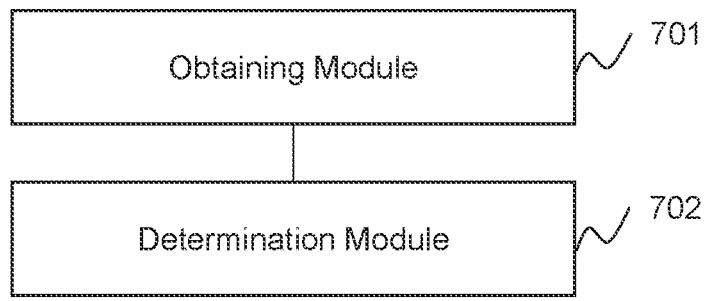
FIG. 9 is a structural schematic diagram illustrating an exemplary apparatus for detection of vehicle traveling state according to some embodiments of the present disclosure.

FIG. 9 is a structural schematic diagram illustrating an apparatus for detection of vehicle traveling state according to some embodiments of the present disclosure.

As shown in FIG. 9, the present disclosure also provides the apparatus for detection of vehicle traveling state. The apparatus may include an obtaining module 701 and a determination module 702.

The obtaining module 701 may be configured to obtain a frequency of an emitted microwave from a microwave sensor and a frequency of a reflected microwave received by the microwave sensor. The microwave sensor may be located at a vehicle head of a vehicle, and The obtaining module 701 may be further configured to obtain a running speed of the vehicle.

The determination module 702 may be configured to determine, according to the frequency of the emitted microwave, the frequency of the reflected microwave, a time interval, and the running speed, whether the vehicle is traveling in a wrong direction.

In some embodiments, the determination module 702 may be further configured to if the frequency of the reflected microwave is higher than the frequency of the emitted microwave, obtain, according to the frequency of the emitted microwave and the frequency of the reflected microwave, a relative speed between the vehicle and a microwave-reflecting object; and determine, according to the relative speed and the running speed, whether the vehicle is traveling in a wrong direction.

In some embodiments, the determination module 702 may be further configured to if the relative speed is higher than the running speed, obtain relative speeds between the vehicle and a plurality of microwave-reflecting objects in preset time; if a count of relative speed(s) higher than the running speed, among the relative speeds between the vehicle and the plurality of microwave-reflecting objects, is greater than a preset threshold value, determine that the vehicle is not traveling in a wrong direction; or the count of relative speed(s) higher than the running speed, among the relative speeds between the vehicle and the plurality of microwave-reflecting objects, is not greater than the preset threshold value, determine that the vehicle is traveling in a wrong direction.

Figure 10:
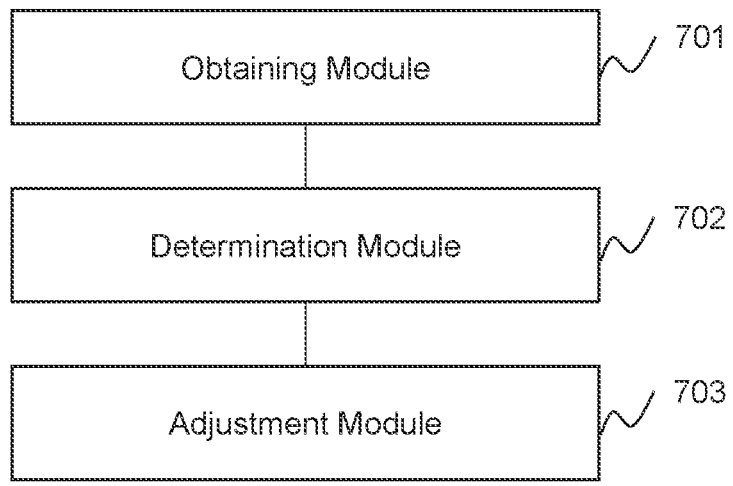
FIG. 10 is a structural schematic diagram illustrating an exemplary apparatus for detection of vehicle traveling state according to some embodiments of the present disclosure.

FIG. 10 is a structural schematic diagram illustrating an apparatus for detection of vehicle traveling state according to some embodiments of the present disclosure.

In some embodiments, as shown in FIG. 10, the apparatus may further include an adjustment module 703 configured to determine, according to the relative speed and a preset corresponding relation between the relative speed and a microwave emitting interval, the microwave emitting interval corresponding to the relative speed; and adjust, according to the microwave emitting interval, a time interval between two adjacent emitted microwaves from the microwave sensor.

In some embodiments, the obtaining module 701 may be further configured to obtain, according to the frequency of the reflected microwave, the frequency of the emitted microwave, and a time interval between emitting the emitted microwave and receiving the reflected microwave, the relative speed and a distance between the vehicle and the microwave-reflecting object; obtain, according to the distance and the relative speed, a departure time interval; and designating a minimum time interval of the departure time interval and the time interval between two adjacent emitted microwaves from the microwave sensor as a time interval of a next emitted microwave from the microwave sensor.

In some embodiments, the obtaining module 701 may be further configured to if a direction of the relative speed is opposite a running direction of the vehicle, obtain, according to the frequency of the reflected microwave, the frequency of the emitted microwave, and a time interval between emitting the emitted microwave and receiving the reflected microwave, a relative speed and a distance between the vehicle and the microwave-reflecting object; obtain, according to the relative speed and a difference between an effective emitting distance of the microwave sensor and the distance, a departure time interval; and designating a minimum time interval of the departure time interval and the time interval between two adjacent emitted microwaves from the microwave sensor as a time interval of a next emitted microwave from the microwave sensor.

In some embodiments, the determination module 702 may be further configured to if the frequency of the reflected microwave is lower than the frequency of the emitted microwave, determine that the vehicle is not traveling in a wrong direction; or if the frequency of the reflected microwave is equal to the frequency of the emitted microwave, determine that the vehicle is not traveling in a wrong direction.

In some embodiments, the determination module 702 may further be configured to if the relative speed is lower than the running speed, determine that the vehicle is not traveling in a wrong direction.

In some embodiments, the determination module 702 may be further configured to if a difference between two adjacent relative speeds is higher than a preset value, determine that objects corresponding to the two adjacent relative speeds are different.

Figure 11:
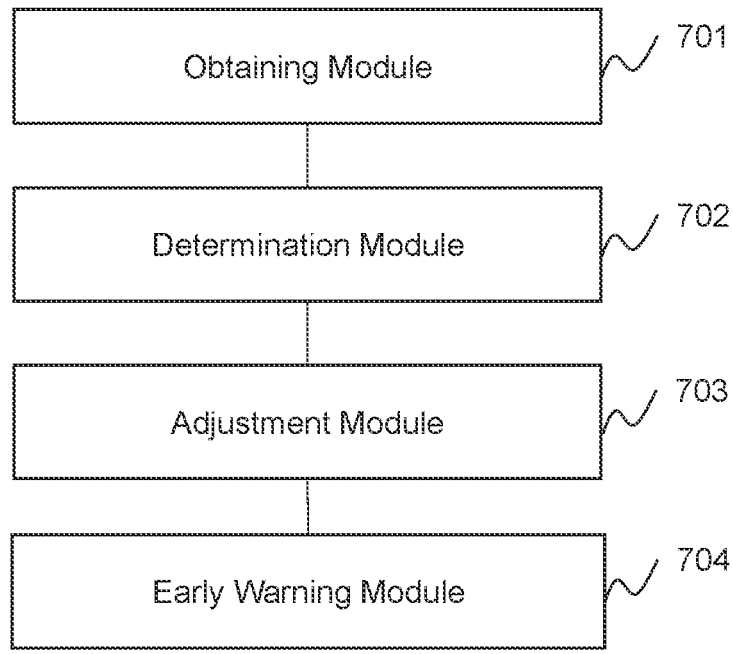
FIG. 11 is a structural schematic diagram illustrating an exemplary apparatus for detection of vehicle traveling state according to some embodiments of the present disclosure.

FIG. 11 is a structural schematic diagram illustrating an apparatus for detection of vehicle traveling state according to some embodiments of the present disclosure.

In some embodiments, as shown in FIG. 11, the apparatus may further include an early warning module 704 configured to obtain, according to the frequency of the reflected microwave, the frequency of the emitted microwave, and a time interval between emitting the emitted microwave and receiving the reflected microwave, the relative speed and a distance between the vehicle and the microwave-reflecting object; determine, according to the distance and the relative speed between the vehicle and the microwave-reflecting object, predicted collision time; and if the predicted collision time is less than or equal to preset safety time, generate an early warning for the vehicle.

Figure 12:
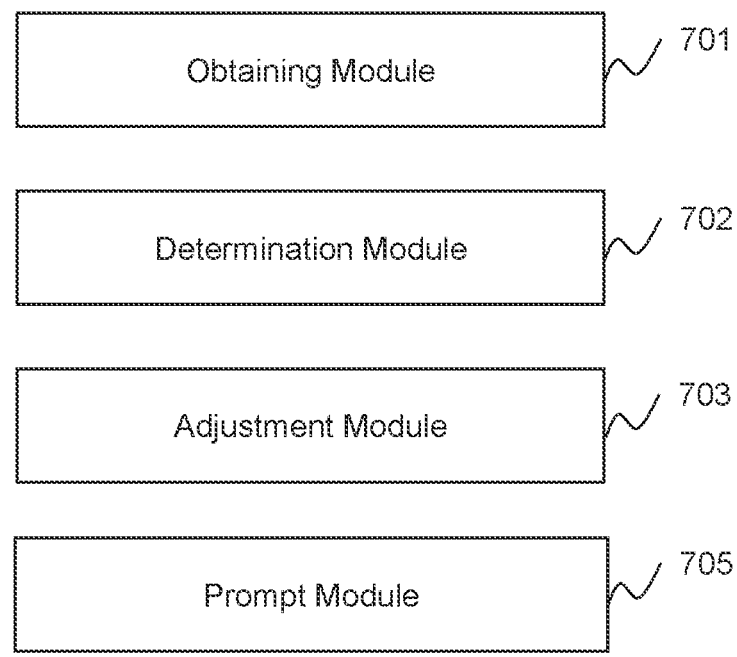
FIG. 12 is a structural schematic diagram illustrating an exemplary apparatus for detection of vehicle traveling state according to some embodiments of the present disclosure.

FIG. 12 is a structural schematic diagram illustrating an apparatus for detection of vehicle traveling state according to some embodiments of the present disclosure.

In some embodiments, as shown in FIG. 12, the apparatus may further include a prompt module 705 configured to if the relative speed between the vehicle and the microwave-reflecting object is higher than or equal to a preset speed, generate a prompt for the vehicle. The preset speed may be twice a maximum running speed of the vehicle.

The above modules may be in connection or communication with each other through a wired connection or a wireless connection. The wired connection may be achieved by means of a metal cable, an optical cable, and a hybrid cable, or the like, or any combination thereof. The wireless connection may include connections of Local Area Network (LAN), Wide Area Network (WAN), Bluetooth, ZigBee, Near-Field Communication (NFC), or the like, or any combination thereof. Two or more modules may be combined into a single module, and any one module may be divided into two or more units. A person skilled in the art would clearly acknowledge that, for ease and brevity of description, the specific operation processes of the above-described systems and apparatuses may refer to the relevant portions of the embodiments of the method described above, which is not repeated herein. According to the several embodiments provided in the present disclosure, it may be understood that the system, apparatus, and method disclosed in the present disclosure may be achieved in other manners. The embodiments of the above-described apparatus are merely illustrative. For example, the module division is merely a logical function division and may include other divisions in actual practice. As another example, multiple modules or components may be combined or integrated into another system, or some features may be ignored or not performed. In addition, the mutual couplings, direct couplings, or communication connections displayed or discussed may be implemented through an indirect coupling or communication connection via some communication interfaces, apparatuses, or modules, which may be implemented in electronic, mechanical, or other forms.

The units which are described as separate modules may be physically separated or may be not physically separated. The components which are illustrated as modules may be or may not be physical units, i.e., the components may be located in the same position or may be distributed to a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

It should be noted that the above modules may be configured s one or more integrated circuits, such as one or more application specific integrated circuits (ASIC), or one or more digital signal processor (DSP), or, one or more field programmable gate array (FPGA), etc., configured to implement the above method, As another example, when one of the above modules is implemented in a form of a processing element scheduling program codes, the processing element may be a general-purpose processor, such as a central processing Unit (CPU) or other processors that can call the program codes. As another example, the modules may be integrated together and implemented in a form of system-on-a-chip (SOC).

Figure 13:
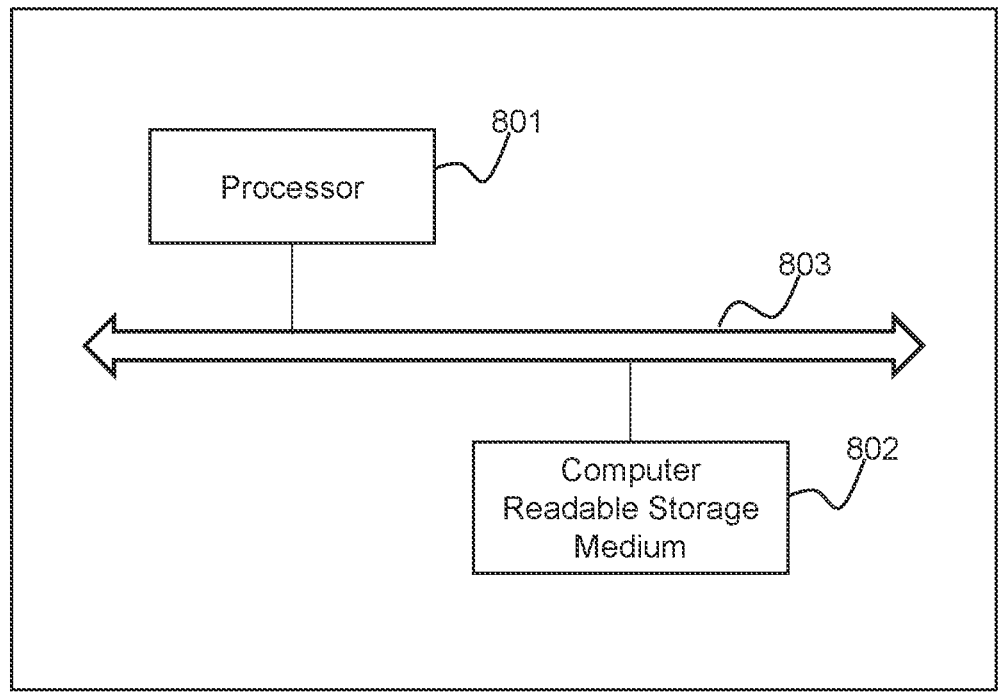
FIG. 13 is a structural schematic diagram illustrating an exemplary electronic device according to some embodiments of the present disclosure.

FIG. 13 is a structural schematic diagram illustrating an exemplary electronic device according to some embodiments of the present disclosure.

As shown in FIG. 13, the electronic device is provided. The electronic may include a processor 801, a computer readable storage medium 802, and a bus 803. The computer readable storage medium 802 may store machine readable instructions executable by the processor 801. When the electronic device operates, the processor 801 may be in communication with the computer readable storage medium 802 via the bus 803, and the processor 801 may execute the machine-readable instruction to perform operations of the method for detection of vehicle traveling state.

The electronic device may include a general-purpose computer, a server, a mobile terminal, etc., which is not limited herein.

It should be noted that the processor 801 may include one or more processor cores (e.g., a single-core processor or a multi-core processor). Merely by way of example, the processor may include a central processing unit (CPU), an application specific integrated circuit (ASIC), an application specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction set computing (RISC), a microprocessor, or the like, or any combination thereof.

The computer readable storage medium 802 may include a mass memory, a mobile memory, a volatile read-write memory, a read-only memory (ROM), or the like, or any combination thereof. Merely by way of example, the mass memory may include a magnetic disk, an optical disk, a solid-state drive, etc. The mobile memory may include a flash drive, a floppy disk, an optical disk, a memory card, a zip disk, a magnetic tape, etc. The volatile read-write memory may include a random-access memory (RAM). The RAM may include a dynamic random-access memory (DRAM), a double date-rate synchronous RAM (DDR SDRAM), a static random-access memory (SRAM), a thyristor-based random-access memory (T-RAM), a zero-capacitor RAM (Zero-RAM), etc. Merely by way of example, the ROM may include a mask read-only memory (MROM), a programmable read-only memory (PROM), a programmable erasable read-only memory (PEROM), an electrically erasable programmable read only memory (EEPROM), a CD-ROM, a digital versatile disk ROM, etc.

For convenience of description, only one processor 801 is described in the electronic device. However, it should be noted that the electronic device in the present disclosure may further include a plurality of processors 801. Accordingly, operations executed by one processor described in the present disclosure may further be jointly executed or independently executed by the plurality of processors. For example, if the processor 801 of the electronic device executes operation A and operation B, it may be understood that the operation A and the operation B may further be executed jointly by two different processors or independently by one processor. For example, a first processor may execute the operation A and a second processor may execute the operation B, or the first processor and the second processor may jointly execute the operations A and B.

In some embodiments, the present disclosure further provides a computer readable storage medium. The computer readable storage medium may store computer programs that, when executed by a processor, direct the processor to perform operations off the method for detection of vehicle traveling state.

The above embodiments are only exemplary embodiments of the present disclosure, which is not intended to limit the scope of the present disclosure. Various modifications and replacements readily derived by those skilled in the art under the teaching of the technical disclosure of the present disclosure shall fall within the scope of the present disclosure. Therefore, the scope of the present disclosure is subject to the appended claims.

What is claimed is:

1. A method for detection of vehicle traveling state, comprising:
   obtaining a frequency of an emitted microwave from a microwave sensor and a frequency of a reflected microwave received by the microwave sensor, wherein the microwave sensor is located at a vehicle head of a vehicle;
   obtaining a running speed of the vehicle; and
   determining, according to the frequency of the emitted microwave, the frequency of the reflected microwave, and the running speed, whether the vehicle is traveling in a wrong direction, comprising:
      if the frequency of the reflected microwave is higher than the frequency of the emitted microwave,
         obtaining, according to the frequency of the emitted microwave and the frequency of the reflected microwave, a relative speed between the vehicle and a microwave-reflecting object; and
         determining, according to the relative speed and the running speed,
      whether the vehicle is traveling in a wrong direction;
      if the frequency of the reflected microwave is lower than the frequency of the emitted microwave, determining that the vehicle is not traveling in a wrong direction; or
      if the frequency of the reflected microwave is equal to the frequency of the emitted microwave, determining that the vehicle is not traveling in a wrong direction.

2. The method of claim 1, wherein the determining, according to the frequency of the emitted microwave, the frequency of the reflected microwave, and the running speed, whether the vehicle is traveling in a wrong direction further comprises:
   if the relative speed is higher than the running speed, obtaining relative speeds between the vehicle and a plurality of microwave-reflecting objects in preset time, the plurality of microwave-reflecting objects including objects with a same running direction as the vehicle and objects with a running direction different from the vehicle;

if a count of relative speeds higher than the running speed, among the relative speeds between the vehicle and the plurality of microwave-reflecting objects, is greater than a preset threshold value,
determining that the vehicle is not traveling in the wrong direction; or if the count of the relative speeds higher than the running speed, among the relative speeds between the vehicle and the plurality of microwave-reflecting objects, is not greater than the preset threshold value,
determining that the vehicle is traveling in the wrong direction.

3. The method of claim 2, further comprising:
obtaining, according to the frequency of the reflected microwave, the frequency of the emitted microwave, and a time interval between emitting the emitted microwave and receiving the reflected microwave, the relative speed and a distance between the vehicle and the microwave-reflecting object;
obtaining, according to the distance and the relative speed, a departure time interval; and
designating a minimum time interval of the departure time interval and a time interval between two adjacent emitted microwaves from the microwave sensor as a time interval of a next emitted microwave from the microwave sensor.

4. The method of claim 2, further comprising:
if a direction of the relative speed is opposite a running direction of the vehicle, obtaining, according to the frequency of the reflected microwave, the frequency of the emitted microwave, and a time interval between emitting the emitted microwave and receiving the reflected microwave, the relative speed and a distance between the vehicle and the microwave-reflecting object;
obtaining, according to the relative speed and a difference between an effective emitting distance of the microwave sensor and the distance, a departure time interval; and
designating a minimum time interval of the departure time interval and a time interval between two adjacent emitted microwaves from the microwave sensor as a time interval of a next emitted microwave from the microwave sensor.

5. The method of claim 2, further comprising:
if a difference between two adjacent relative speeds is higher than a preset value, determining that objects corresponding to the two adjacent relative speeds are different.

6. The method of claim 1, wherein the determining, according to the frequency of the emitted microwave, the frequency of the reflected microwave, and the running speed, whether the vehicle is traveling in a wrong direction further comprises:
determining, according to the relative speed and a preset corresponding relation between the relative speed and a microwave emitting interval, the microwave emitting interval corresponding to the relative speed; and
adjusting, according to the microwave emitting interval, a time interval between two adjacent emitted microwaves from the microwave sensor.

7. The method of claim 1, wherein the determining, according to the relative speed and the running speed, whether the vehicle is traveling in a wrong direction comprises:
if the relative speed is lower than the running speed, determining that the vehicle is not traveling in a wrong direction.

8. The method of claim 1, further comprising:
obtaining, according to the frequency of the reflected microwave, the frequency of the emitted microwave, and a time interval between emitting the emitted microwave and receiving the reflected microwave, the relative speed and a distance between the vehicle and the microwave-reflecting object;
determining, according to the distance and the relative speed between the vehicle and the microwave-reflecting object, predicted collision time; and
if the predicted collision time is less than or equal to preset safety time, generating an early warning for the vehicle.

9. The method of claim 1, further comprising:
if the relative speed between the vehicle and the microwave-reflecting object is higher than or equal to a preset speed, generating a prompt for the vehicle, wherein the preset speed is twice a maximum running speed of the vehicle.

10. The method of claim 1, wherein the determining, according to the frequency of the emitted microwave, the frequency of the reflected microwave, and the running speed, whether the vehicle is traveling in a wrong direction further comprises:
if the relative speed is higher than the running speed,
obtaining relative speeds between the vehicle and a plurality of microwave-reflecting objects in a preset time, the plurality of microwave-reflecting objects include at least one microwave-reflecting object with a same running direction as the vehicle and at least one microwave-reflecting object with a running direction different from the vehicle;
if a proportion of the at least one microwave-reflecting object with the same running direction as the vehicle is greater than a preset threshold value,
determining that the vehicle is not traveling in the wrong direction; or
if a proportion of the at least one microwave-reflecting object with the same running direction as the vehicle is less than the preset threshold value,
determining that the vehicle is traveling in the wrong direction.

11. An electronic device for detection of vehicle traveling state, comprising:
at least one storage medium including instructions;
at least one processor in communication with the at least one storage medium, wherein when executing the instructions, the at least one processor is configured to direct the electronic device to:
obtain a frequency of an emitted microwave from a microwave sensor and a frequency of a reflected microwave received by the microwave sensor, wherein the microwave sensor is located at a vehicle head of a vehicle;
obtain a running speed of the vehicle; and
determine, according to the frequency of the emitted microwave, the frequency of the reflected microwave, and the running speed, whether the vehicle is traveling in a wrong direction, wherein the at least one processor is further configured to direct the electronic device to:
if the frequency of the reflected microwave is higher than the frequency of the emitted microwave,
obtain, according to the frequency of the emitted microwave and the frequency of the reflected microwave, a relative speed between the vehicle and a microwave-reflecting object; and
determine, according to the relative speed and the running speed, whether the vehicle is traveling in a wrong direction; or
if the frequency of the reflected microwave is lower than or equal to the frequency of the emitted microwave, determine that the vehicle is not traveling in a wrong direction.

12. The electronic device of claim 11, wherein the at least one processor is further configured to direct the electronic device to:
if the relative speed is higher than the running speed, obtain,
relative speeds between the vehicle and a plurality of microwave-reflecting objects in preset time;
if a count of relative speeds higher than the running speed, among the relative speeds between the vehicle and the plurality of microwave-reflecting objects, is greater than a preset threshold value, determine that the vehicle is not traveling in a wrong direction; or
if the count of the relative speeds higher than the running speed, among the relative speeds between the vehicle and the plurality of microwave-reflecting objects, is not greater than the preset threshold value, determine that the vehicle is traveling in a wrong direction; or
if the relative speed is lower than the running speed, determine that the vehicle is not traveling in a wrong direction.

13. The electronic device of claim 12, wherein the determination module is further configured to
if a difference between two adjacent relative speeds is higher than a preset value, determine that objects corresponding to the two adjacent relative speeds are different.

14. The electronic device of claim 11, wherein the at least one processor is further configured to direct the electronic device to:
determine, according to the relative speed and a preset corresponding relation between the relative speed and a microwave emitting interval, the microwave emitting interval corresponding to the relative speed; and
adjusting, according to the microwave emitting interval, a time interval between two adjacent emitted microwaves from the microwave sensor.

15. The electronic device of claim 11, wherein the at least one processor is further configured to direct the electronic device to:
obtain, according to the frequency of the reflected microwave, the frequency of the emitted microwave, and a time interval between emitting the emitted microwave and receiving the reflected microwave, the relative speed and a distance between the vehicle and the microwave-reflecting object;
obtain, according to the distance and the relative speed, a departure time interval; and
designate a minimum time interval of the departure time interval and a time interval between two adjacent emitted microwaves from the microwave sensor as a time interval of a next emitted microwave from the microwave sensor.

16. The electronic device of claim 11, further comprising an early warning module configured to
obtain, according to the frequency of the reflected microwave, the frequency of the emitted microwave, and a time interval between emitting the emitted microwave and receiving the reflected microwave, the relative speed and a distance between the vehicle and the microwave-reflecting object;
determine, according to the distance and the relative speed between the vehicle and the microwave-reflecting object, predicted collision time; and
if the predicted collision time is less than or equal to preset safety time, generate an early warning for the vehicle.

17. The electronic device of claim 11, further comprising a prompt module configured to
generate a prompt for the vehicle if the relative speed between the vehicle and the microwave-reflecting object is higher than or equal to a preset speed, the preset speed being twice a maximum running speed of the vehicle.

18. A non-transitory computer readable storage medium, storing computer programs that, when executed by a processor, direct the processor to perform operations of a method for detection of vehicle traveling state, the method comprising:
obtaining a frequency of an emitted microwave from a microwave sensor and a frequency of a reflected microwave received by the microwave sensor, wherein the microwave sensor is located at a vehicle head of a vehicle;
obtaining a running speed of the vehicle; and
determining, according to the frequency of the emitted microwave, the frequency of the reflected microwave, and the running speed, whether the vehicle is traveling in a wrong direction, wherein the method further comprising:
if the frequency of the reflected microwave is higher than the frequency of the emitted microwave,
obtaining, according to the frequency of the emitted microwave and the frequency of the reflected microwave, a relative speed between the vehicle and a microwave-reflecting object; and
determining, according to the relative speed and the running speed,
whether the vehicle is traveling in a wrong direction; or
if the frequency of the reflected microwave is lower than or equal to the frequency of the emitted microwave, determine that the vehicle is not traveling in a wrong direction.

* * * * *